Oct. 31, 1961   V. D. POLHEMUS ET AL   3,006,429
SUSPENSION SYSTEM FOR VEHICLE DRIVING WHEELS
Filed Oct. 21, 1957   12 Sheets-Sheet 1

Fig. 1

INVENTORS
VON D. POLHEMUS
JOHANNES W. ROSENKRANDS
BY
W. S. Pettigrew
ATTORNEY

Oct. 31, 1961 V. D. POLHEMUS ET AL 3,006,429
SUSPENSION SYSTEM FOR VEHICLE DRIVING WHEELS
Filed Oct. 21, 1957 12 Sheets-Sheet 2

INVENTORS
VON D. POLHEMUS
JOHANNES W. ROSENKRANDS
BY
W. S. Pettigrew
ATTORNEY

United States Patent Office 3,006,429
Patented Oct. 31, 1961

3,006,429
SUSPENSION SYSTEM FOR VEHICLE
DRIVING WHEELS
Von D. Polhemus, Franklin, and Johannes W. Rosenkrands, Detroit, Mich., assignors to General Motors Corporation, Detroit, Mich., a corporation of Delaware
Filed Oct. 21, 1957, Ser. No. 691,478
3 Claims. (Cl. 180—73)

This invention relates to suspension and more particularly to vehicle rear wheel suspension wherein the wheels are rotatably supported on a rigid dead axle.

Numerous systems of suspension for the driving wheels of a vehicle have been devised in the past in which the differential is suspended from or otherwise supported on the vehicle frame, the driving wheels being operatively connected thereto by means of swinging half axles. In some cases, the wheels are bodily movable independently of each other, while in others, both wheels are maintained in constant parallel relation by means of a rigid dead axle. It is to the latter type, commonly known as a "De Dion" system, to which the present invention is directed. As used herein, the term "De Dion" is intended to embrace broadly any suspension of the general character stated, without limitation as to elastic medium employed or to the form of constraining means by which the wheels and dead axle are guided relative to the sprung mass.

In general, it is desirable that rear wheel suspension afford freedom from acceleration squat and brake lift, and possess the ability to induce a calculated degree of understeer responsive to roll deflection of the sprung mass. However, in the past, "De Dion" suspensions combining the stated functions have proved elusive. In practice, those capable of effecting the desired degree of understeer exhibited excessive squat and lift tendencies, while those capable of controlling squat and lift produced dangerous oversteer in turns.

An object of the present invention is to provide an improved "De Dion" suspension.

Another object is to provide a suspension of the type referred to in which the elastic medium affords greater resistance to roll deflection than to parallel ride deflection of the same magnitude.

Another object is to provide a "De Dion" suspension in which the axle and wheel assembly constraining means affords substantial freedom from acceleration squat and brake lift.

A further object is to provide a suspension of the stated character having a control linkage system which induces understeer characteristics responsive to roll deflection, as well as eliminating squat and lift induced by acceleration or braking torque.

Yet a further object is to provide a "De Dion" type suspension in which the wheels and dead axle are guided by a system of links which are arranged so that the springs disposed between the sprung mass and the unsprung mass deflect a greater degree responsive to a given magnitude of wheel motion induced by roll deflection than by corresponding wheel motion induced by parallel ride deflection whereby high body roll resistance is obtained without the addition of an auxiliary roll stabilizer.

In accordance with the general features of the invention, the foregoing objects are accomplished by a three element articulated linkage comprising a pair of laterally spaced apart longitudinally extending radius arms or guiding links and a center link. Each guiding link is pivotally connected at one end to the dead axle and at the other end to the vehicle frame. The center link is pivotally connected at one end to the dead axle on an axis parallel therewith and at the other end is universally connected to the vehicle sprung mass, or vice versa. The invention contemplates numerous modifications, all of which are characterized by the fact that an imaginary transverse axis passing through the pivotal connection of each longitudinal link with the dead axle is not coincidental with the pivotal connection between the center link and the dead axle. Further, each of the embodiments shown respond to the generic requirement that a line drawn from the wheel center and passing through the intersection of the projected planes of the guiding links and center link slopes downwardly to the rear.

The foregoing objects, advantages and features of the invention will become more fully apparent as reference is had to the accompanying specification and drawings wherein.

Figure 1:
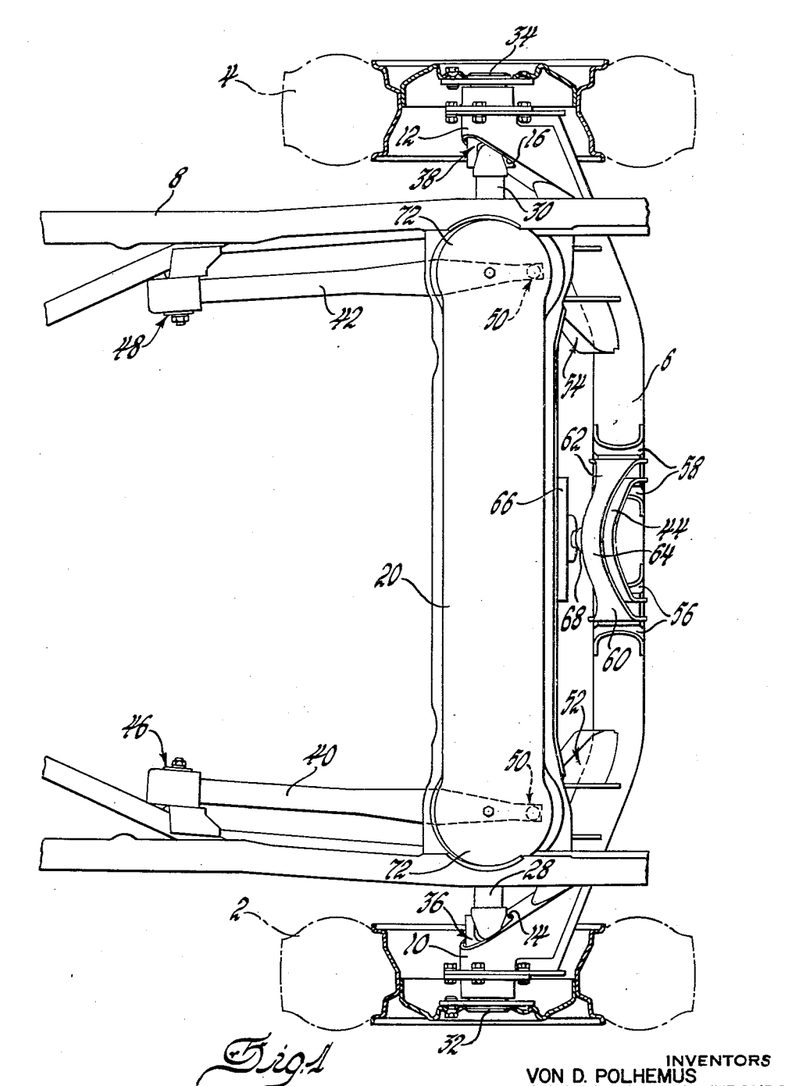
FIG. 1 is a plan view, partly in section, showing the general arrangement of a suspension system according to the present invention.
Figure 2:
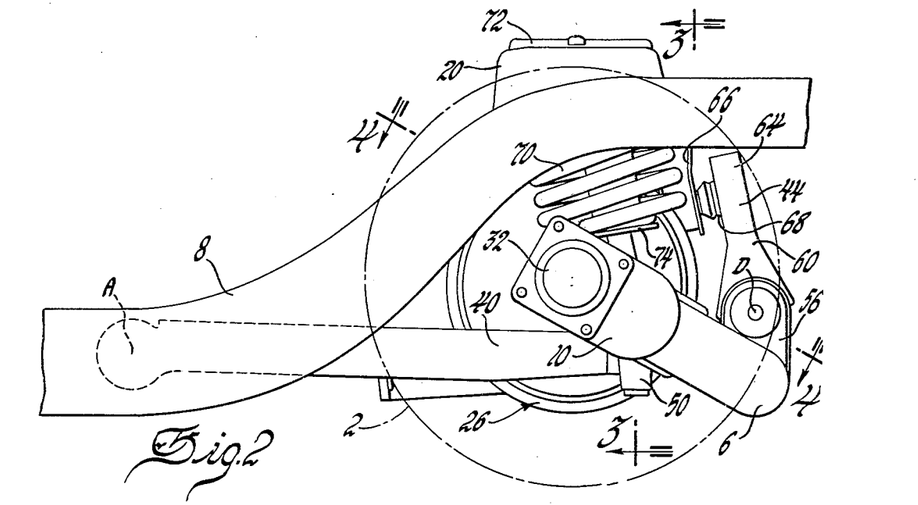
FIG. 2 is a fragmentary side elevational view of the structure shown in FIG. 1.
Figure 3:
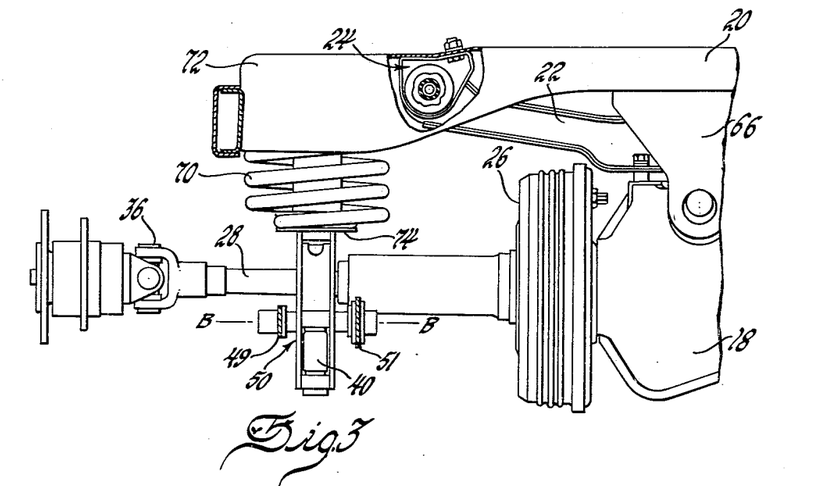
FIG. 3 is a fragmentary rear elevational view, partly in section, looking in the direction of arrows 3—3 of FIG. 2.
Figure 4:
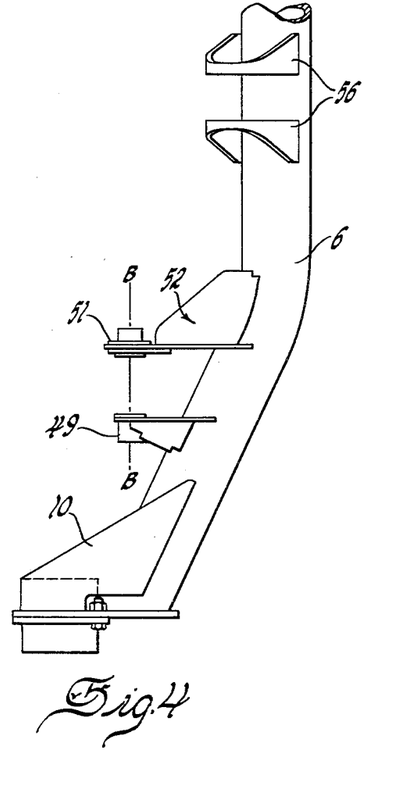
FIG. 4 is an enlarged fragmentary view of a portion of the dead axle structure, showing details of construction thereof.

Referring now to the drawings and particularly FIGS. 1, 2 and 3, there is shown a rear wheel suspension of the "De Dion" type in which the driving wheels 2 and 4 are rotatably supported at opposite ends of a tubular rigid axle 6 which extends transversely of the vehicle frame 8. Near each of its opposite ends, axle 6 bends forward slightly and is provided with integral sleeve-like portions 10 and 12 having transverse apertures 14 and 16 which are disposed in alignment with the transverse centerline of the vehicle differential 18. Differential assembly 18, in turn, is resiliently supported on the frame cross member 20 by means of a transverse bracket 22, the opposite ends of which are mounted in rubber bushed assemblies 24 connected to cross frame 20. Differential assembly 18 is of the type including inboard brake assemblies 26 disposed at either side thereof in concentric relation with the transverse centerline thereof. Driving wheels 2 and 4 are operatively connected to differential assembly 18 by means of swingable half axles 28 and 30, respectively. Inasmuch as the wheels 2 and 4 are maintained in constant parallel relation by dead axle 6, each of the half axles 28 and 30 are universally connected at their inboard ends to differential 18 and similarly universally connected to wheel driving spindles 32 and 34 by means of Cardan or other suitable universal joints 36 and 38.

Figure 5:
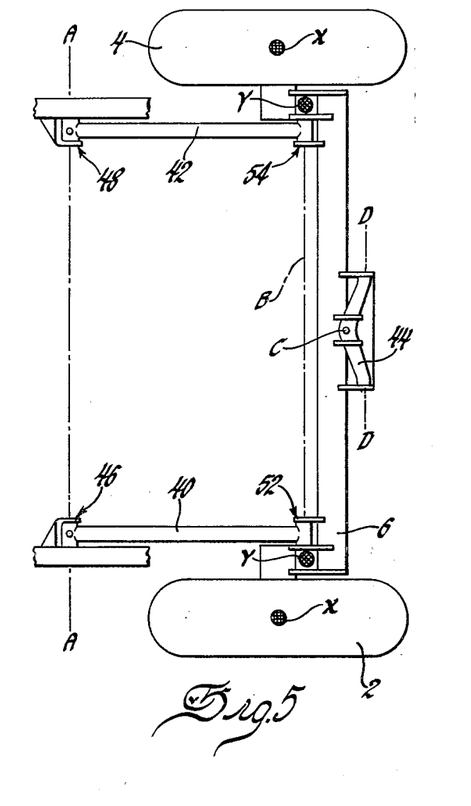
FIGS. 5, 6 and 7 are diagrammatic illustrations depicting the location of and variation in path of movement of the wheel center and suspension springs resulting from roll deflection and parallel ride deflection of the sprung mass.

To control the path of movement of wheels 2 and 4 in response to various dynamic conditions, in accordance with the present invention dead axle 6 is articulatably connected to frame 8 by means of a pair of laterally spaced generally longitudinally extending radius arms 40 and 42 and a transversely centrally disposed link 44. In the embodiment shown in FIGS. 1, 2 and 3 and diagrammatically in FIG. 5, arms 40 and 42 are pivotally connected at their forward ends to the right and left frame side rails, respectively, by pin joints 46 and 48 which define a common axis "A," while the rearward ends thereof are connected to semi-universal swivel assemblies 50 which, in turn, are pivotally supported on a transverse axis "B" between the laterally spaced ears 49 and 51 of forwardly extending brackets 52 and 54 rigidly secured respectively near the opposite ends of dead axle 6. Centrally of its length, axle 6 is also provided with a pair of laterally spaced brackets 56 and 58 in which the laterally spaced depending opposite legs 60 and 62 of center link 44 are pivotally secured for movement about a transverse axis "D" parallel to axle 6. The upper end 64 of link 44, in turn, is connected by means of a ball and socket assembly 68 defining the point "C" to a bracket 66 depending from cross frame member 20 slightly rearwardly of differential 18.

In the embodiment shown, frame 8 is resiliently supported with respect to the wheel and axle assembly by means of coil springs 70 disposed between spring seats 72 in cross frame member 20 and annular spring seats 74 formed integrally on the upper end of swivel assemblies 50, previously referred to. It should be understood, however, that coil springs 70 are shown for purposes of illustration only, the invention being in no sense limited to any particular type of elastic medium.

Although the general form of rear suspension commonly designated as "De Dion" has long been known and is well represented in the prior art, heretofore such suspensions have had little success in passenger car application not only because of the relatively high cost thereof, but also due to the fact that prior art forms either exhibited an undesirable acceleration squat and brake lift tendency or displayed an undesirable, if not dangerous, degree of oversteer during roll deflection. The present invention successfully achieves substantial elimination of acceleration squat and brake lift, while at the same time inducing the desired understeer characteristic in roll deflection.

In order that the kinematics of the subject suspension may be more fully understood, reference is made to FIGS. 6 and 7 and FIGS. 8 and 9, which demonstrate, respectively, how the tendency to lift or squat is overcome and how the desired understeer condition is accomplished.

Figure 6:
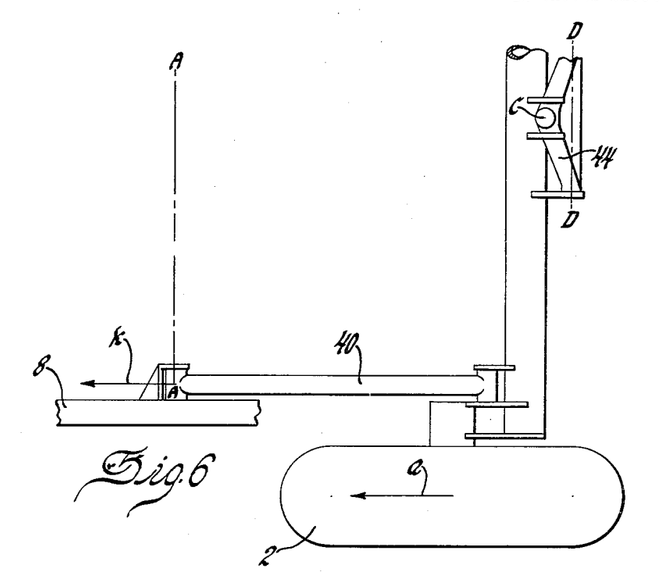
Figure 7:
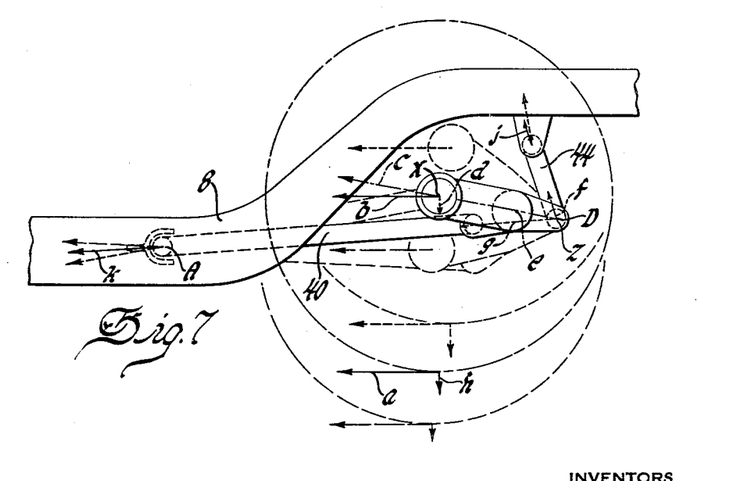

With respect to FIGS. 6 and 7, acceleration and braking torques are considered as applied to the system at point X since all wheel forces necessarily pass to the axle through the wheel axis when the differential and brakes are mounted on the frame. Accordingly, acceleration force "a" is parallel translated as force "b" acting on point X. To determine reactions, force "b" is resolved into its components "c" and "d," the latter of which acts in a vertical direction producing a single reaction "h" acting on the ground. Component "c" may be similarly translated as force "e" acting on point Z. Point Z is located at the intersection of the projected planes of the guiding links and center link and in the embodiment shown in FIGS. 1-12 is coincidental with axis D when the vehicle is at design height. The change in position of point Z at bump and rebound will be evident from FIGS. 10 and 12. Force "e" resolves into components "f" and "g" which produce reactions "j" and "k" acting on the sprung mass at points "C" and "A," respectively. Direction and magnitude of forces "a," "b" and reaction forces "j" and "k" when the wheel is in bump position are shown in dotted lines, while those for rebound position are shown in dashed lines. In interpreting the reaction forces shown in FIG. 7, it must be borne in mind that during acceleration some vehicle weight is transferred from the front to the rear wheels. In a 100% anti-squat suspension, this weight shift is directly proportional to the acceleration force, and is therefore equal to the reaction "h"; consequently, higher rear wheel loading during acceleration is accomplished without assistance from springs 70. It therefore follows that the rear end of the sprung mass will remain at the same vertical level during acceleration and thus eliminate the common tendency to squat during acceleration. It will also be evident that, for a given horizontal force, the reactions vary when the wheel is deflected from the normal design height position shown in solid lines. Thus, when the wheel is in the bump position (shown in dotted lines), the magnitude of reaction "h" on the road is in excess of that necessary to balance weight transfer. Hence, the suspension springs are relieved of some load and the rear of the sprung mass will raise to its normal position. Conversely, road reaction "h" is decreased when the wheel is in rebound position (shown in dashed lines), which similarly tends to return the sprung mass to its normal vertical position. Inasmuch as the reaction forces described above are reversible, application of the vehicle brakes produces corresponding reactions but in opposite directions, thus tending to keep the sprung portion of the vehicle at a constant level when deceleration causes weight transfer from rear wheels to the front wheels.

Figure 8:
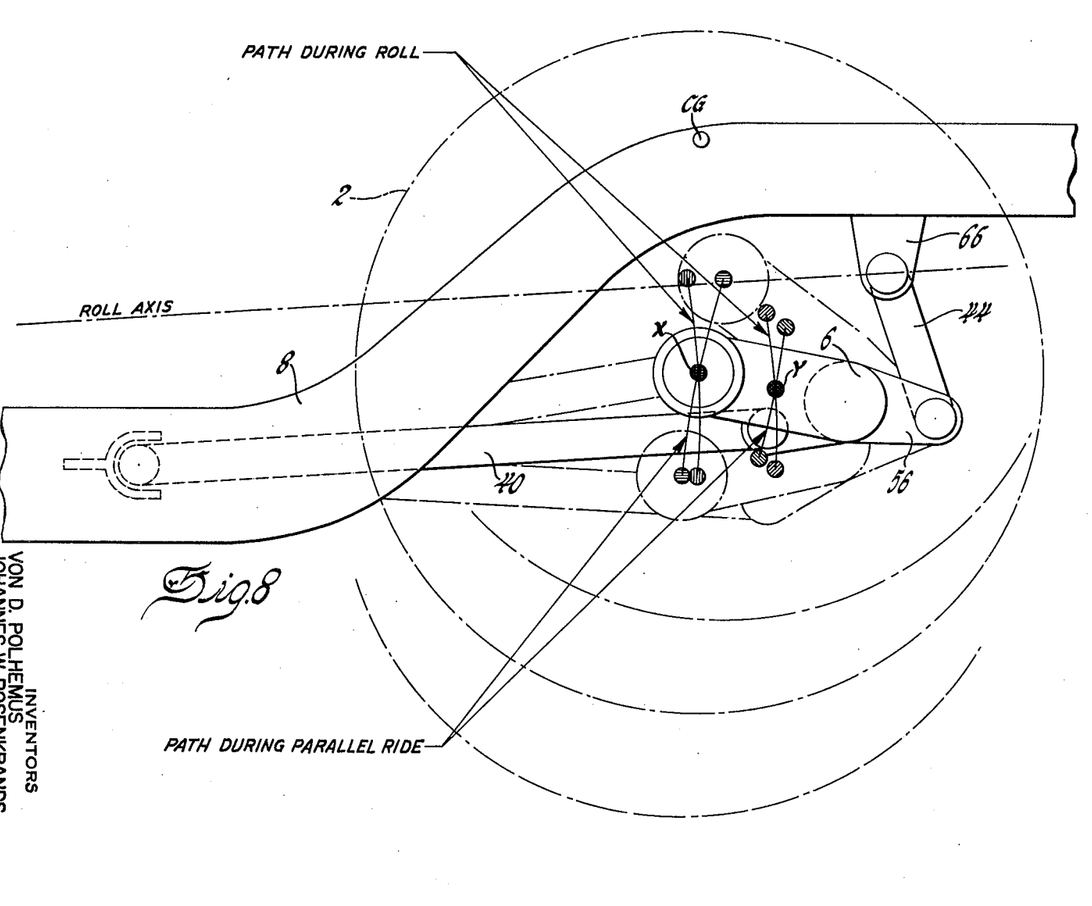
FIGS. 8 and 9 are diagrams illustrating resolution of force resulting from acceleration and braking and for various wheel deflection positions.
Figure 9:
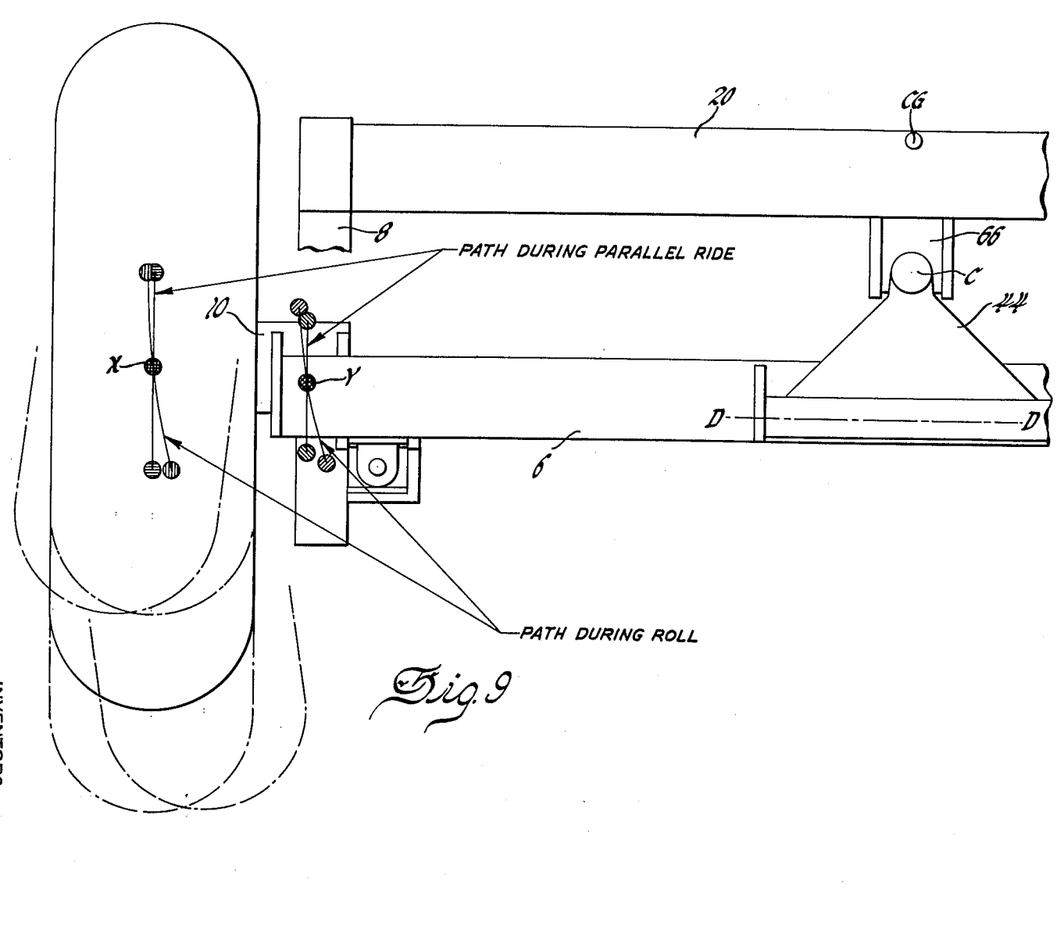
Figures 10, 11:
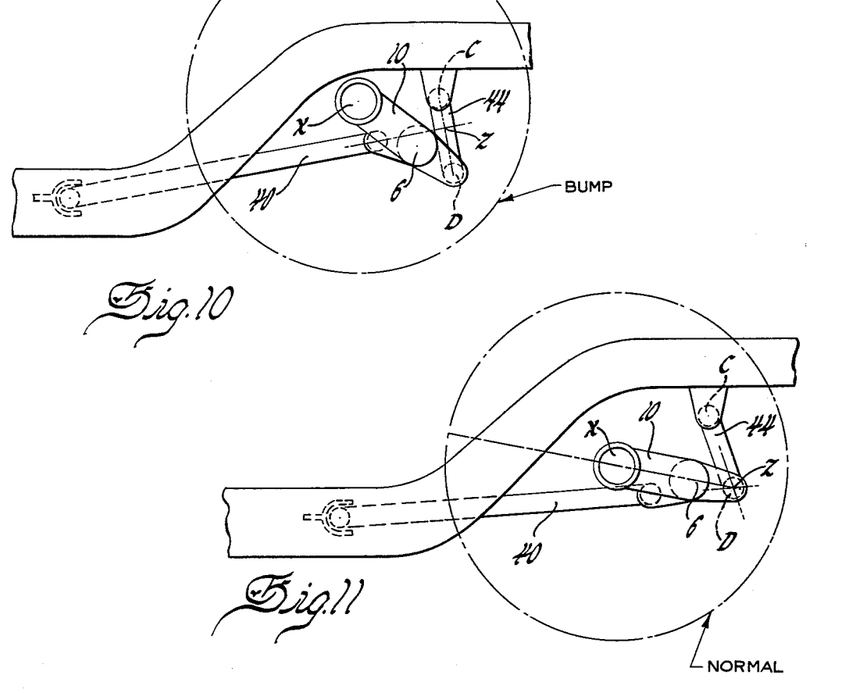
FIGS. 10, 11 and 12 are sequential views illustrating the change in angular relationship of the components of the wheel guiding system linkage and dead axle through the maximum range of wheel movement.
Figure 12:
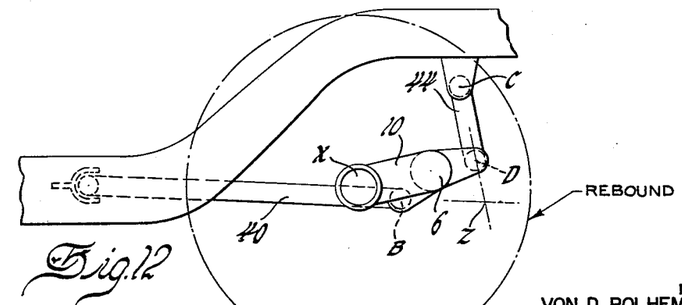
Figure 13:
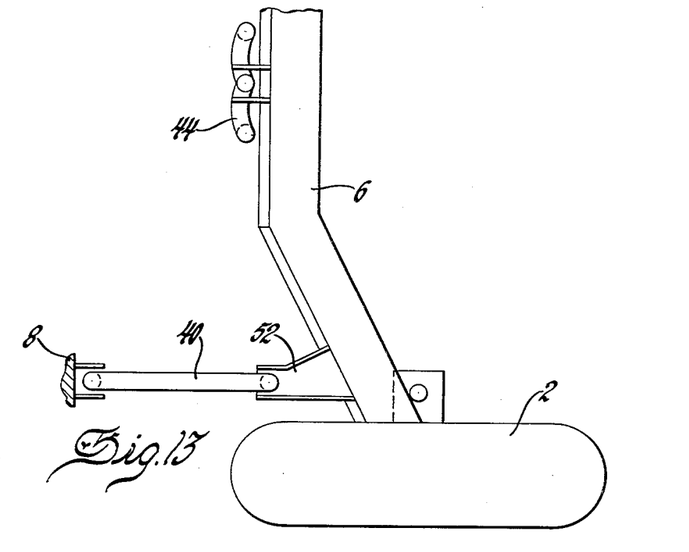
FIGS. 13, 14, 15, 16, 17, 18, 19, 20, 21 and 22 illustrate diagrammatically various other possible combinations and variations of wheel and axle guiding linkage, which respond to the general features of the invention.
Figure 14:
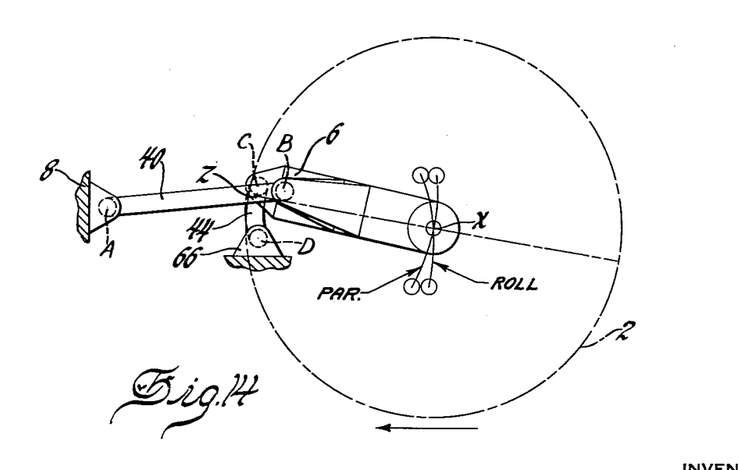
Figure 15:
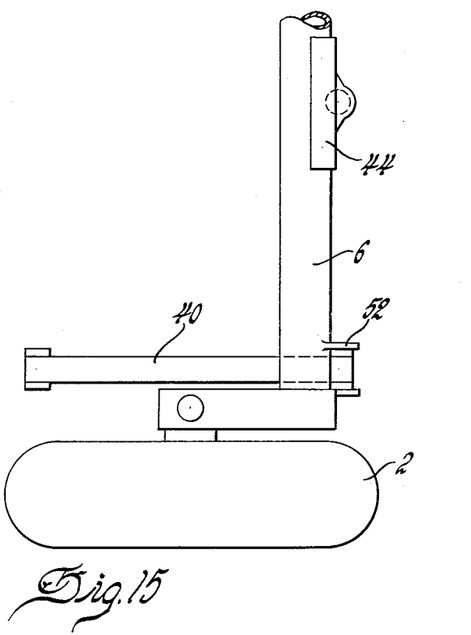
Figure 16:
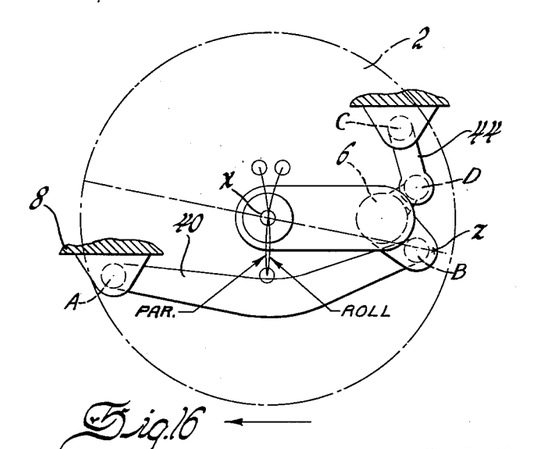
Figure 17:
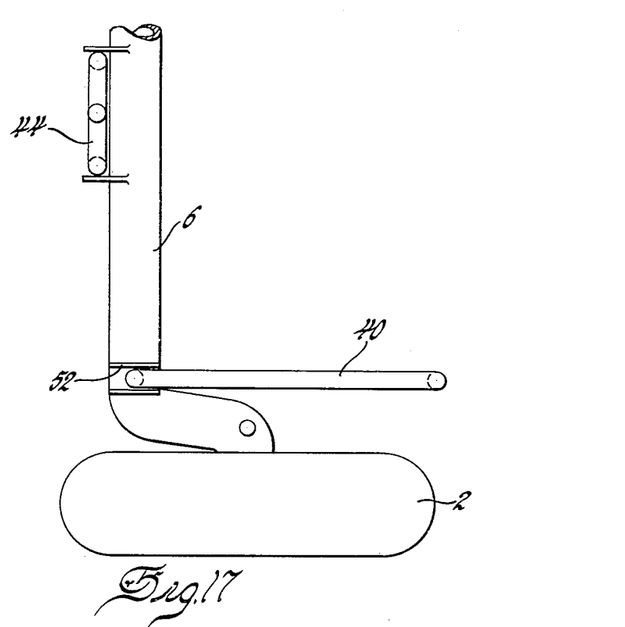
Figure 18:
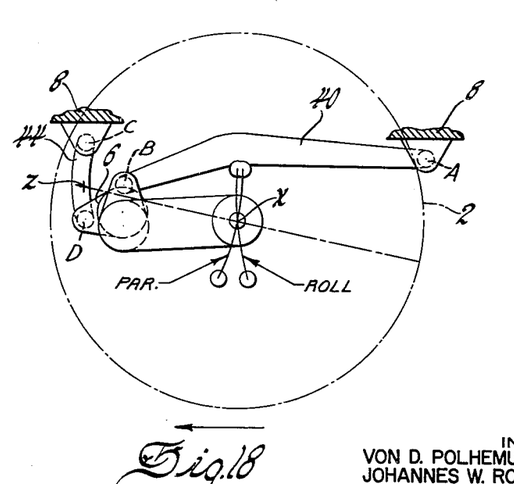
Figure 19:
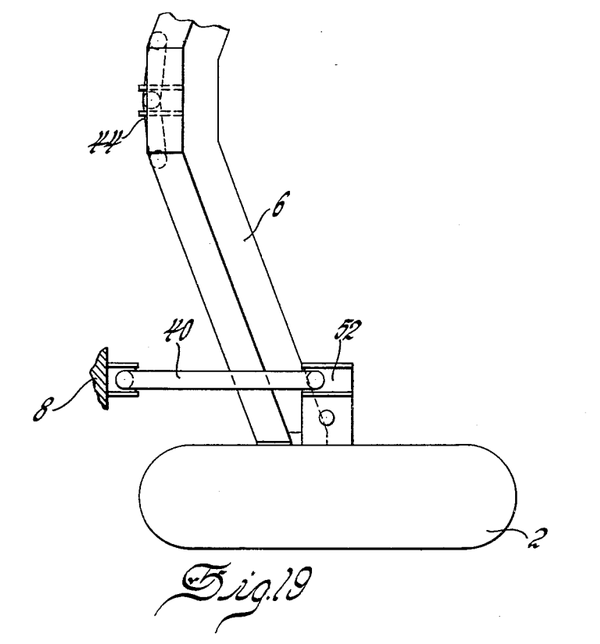
Figure 20:
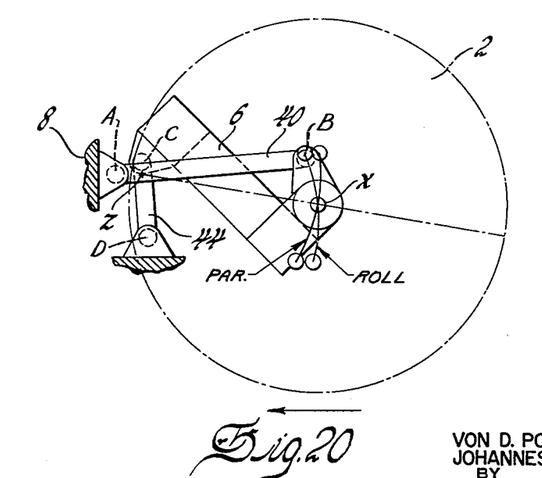
Figure 21:
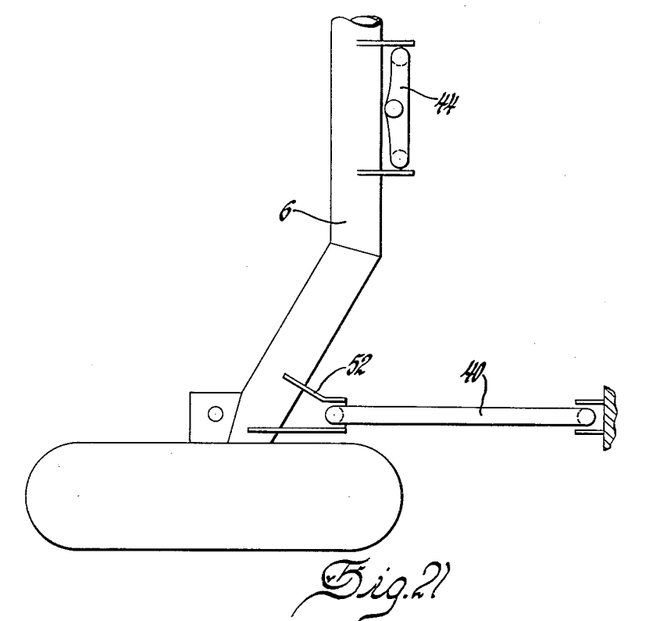
Figure 22:
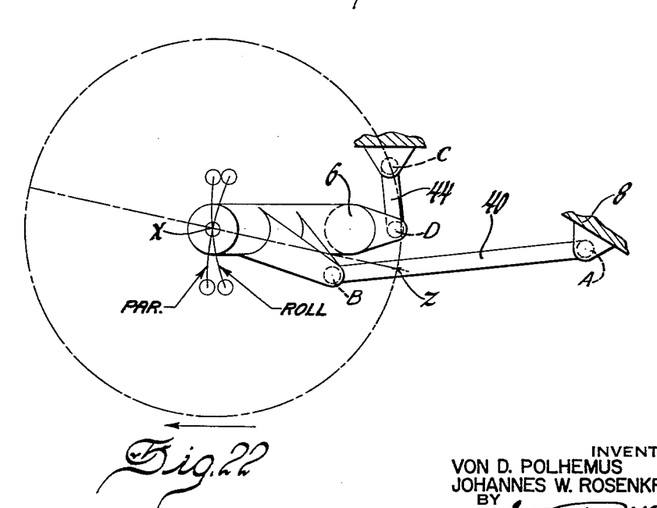

FIGS. 8 and 9 show diagrammatically the geometric factors which govern "roll steer" characteristics of the suspension. FIG. 8 shows the kinematic relationship of the radius arms, dead axle and center link when the wheel is in normal, bump and rebound positions, respectively, both in the case of parallel ride deflection and the roll deflection. As will be evident from the arc labeled Path During Parallel Ride, upward movement of the wheel center X from its normal position is accompanied by rearward movement which results in reduction in harshness of impact resulting from surmounting road obstacles during normal vehicle travel. However, when the wheel center X moves upwardly relative to the sprung mass as a result of roll deflection induced by cornering, the wheel center X travels through an upwardly and forwardly directed arc labeled Path During Roll. Inasmuch as forward and upward movement of wheel center X relative to the sprung mass occurs with respect to the rear wheel at the outboard side of a turn, it will be evident that the wheel associated therewith will steer into the direction of the turn being made, while the opposite rear wheel at the inboard side of the turn will deflect downwardly relative to the sprung mass and hence its wheel center X will move slightly rearwardly of the location at normal height. Thus, the two rear wheels remain in parallel relation, but are angled toward the inboard side of the turn, which tends to steer the vehicle out of the turn dictated by the steering angle of the front wheels, thus producing the so-called understeer condition. In FIGS. 10, 11 and 12, the sequential positions of the linkage shown in superimposed relation in FIG. 8 are depicted in individual views to more clearly illustrate the change in geometric relation thereof.

In addition to the ability to provide substantially level ride during acceleration and braking and understeer in roll deflection, the subject suspension achieves substantial resistance to body roll without employing the usual torsional roll stabilizer or other auxiliary device. Thus, purely by virtue of the geometric characteristics of the control linkage and axle, wheel movement responsive to roll deflection of the sprung mass produces greater spring deflection than corresponding wheel movement in parallel ride deflection. In this connection, attention is again directed to FIGS. 8 and 9 wherein it will be seen that the magnitude of deflection of point "y" (which denotes the point of engagement of spring 70 with dead axle 6) is greater in roll deflection of the sprung mass than for parallel ride deflection of the sprung mass, although the degree of wheel deflection is identical. Hence, it will readily be seen that springs 70 will be compressed and expanded more during roll deflection than parallel ride deflection and, therefore, offers greater resistance to body roll than would be the case if spring expansion and deflection were uniform for both roll and parallel ride deflection, as is the case in conventional construction. The subject construction thus affords all of the advantages of a conventional roll stabilizer yet eliminates both the additional cost of and the tendency of the latter to harshen ride characteristics. It is to be particularly noted that the above mentioned feature is accomplished without any additional cost, requiring only that the points "y" be spaced longitudinally from wheel center X in the direction of the pivotal connection between axle 6 and center link 44.

In FIGS. 13 and 14, 15 and 16, 17 and 18, 19 and 20, and 21 and 22, there are shown five modifications or variations of the subject suspension which serve to illustrate the numerous forms it may take. In each case, for the sake of clarity, reference characters corresponding to those applied to the preferred embodiment designate equivalent elements in the modified forms. Each of the five modifications shown prevent acceleration squat and brake lift, induce the desired understeer during roll deflection of the sprung mass, and product improved roll resistance in the manner described hereinabove. By reference to FIGS. 6, 7 and 13 through 20, it will be seen that the essential features of the system reside in providing an axle constraining linkage of the general type described wherein a line drawn from the wheel center X through the intersection Z of the projected planes of the radius arms and center link will slope downwardly toward the rear of the vehicle, while the imaginary axis passing through the pivotal connection between the radius arms and dead axle is parallel with but spaced from the pivotal connection between the center link and dead axle. Since the point Z moves with respect to the dead axle as the wheels move up and down, a predetermined rate of change of anti-squat may be attained, resulting in uniform anti-squat and anti-lift force throughout the entire range of movement of the wheels. By way of comparison, when the point Z is maintained in a fixed relation to the dead axle, anti-squat forces build up rapidly as the wheels depart from normal position with the result that the anti-squat force produced is correct only when the wheels are at or near normal position.

The expressions normal position, design height, and static loading are used synonymously herein to denote a condition wherein the system is static and normal vehicle load is being supported.

While the forms of the apparatus herein described constitute preferred embodiments, numerous changes and modifications may be made therein without departing from the scope of the invention. It is, therefore, to be understood that it is not intended to limit the invention to the embodiments shown, but only by the scope of the claims which follow.

We claim:

1. In combination, a vehicle including a supported chassis portion, a supporting chassis portion including driving wheels, a dead axle extending transversely beneath the supported portion and having opposite longitudinally extending arm portions supporting said wheels on a common axis of rotation, a pair of generally longitudinally directed links arranged in laterally spaced apart relation, means pivotally connecting one end of each link to said supported portion and the other end of each link to said dead axle on a common axis, a center link disposed between and above said longitudinal links, one end of said center link being pivoted to said supported portion and the other end being pivoted to said dead axle on an axis parallel with but spaced from said last mentioned common axis, and spring means disposed between said supported and supporting portions, said spring means engaging said supporting portion between said wheel axis and the axis defined by the pivotal connection between said center link and said dead axle.

2. In combination, a vehicle including a supported chassis portion, a supporting chassis portion including driving wheels, a dead axle extending transversely beneath the supported portion and having opposite longitudinally extending arm portions supporting said wheels on a common axis of rotation, a pair of generally longitudinally directed links arranged in laterally spaced apart relation, means pivotally connecting one end of each link to said supported portion and the other end of each link to said dead axle on a common axis, a center link disposed between and above said longitudinal links, one end of said center link being pivoted to said supported portion and the other end being pivoted to said dead axle on an axis parallel with but spaced from said last mentioned common axis, and spring means disposed between said supported and supporting portions, said spring means engaging said dead axle between said wheel axis and the axis defined by the pivotal connection between said center link and said dead axle.

3. In a motor vehicle, a sprung portion, an unsprung portion including driving wheels, a dead axle extending transversely beneath the sprung portion and having opposite longitudinally extending arm portions supporting said wheels on a common axis of rotation, axle constraining means comprising a pair of spaced apart links pivotally connected at their opposite ends to said sprung portion and said dead axle, respectively, and a center link pivotally connected at its opposite ends to said sprung portion and said axle respectively, the pivotal connections between the spaced apart links and axle and center link and axle both being located forwardly of the wheel axis, said links normally occupying positions such that a plane passing through the wheel axis and the intersection of the projected planes of the links slopes downwardly toward the rear of the vehicle.

References Cited in the file of this patent

UNITED STATES PATENTS 2,689,015    Nallinger _____________ Sept. 14, 1954

FOREIGN PATENTS 736,324    Great Britain __________ Sept. 7, 1955